United States Patent [19]

Schröder

[11] Patent Number: 4,740,979
[45] Date of Patent: Apr. 26, 1988

[54] DYE LASER

[75] Inventor: Eckhard Schröder, Eckental, Fed. Rep. of Germany

[73] Assignee: Meditec Reinhardt Thyzel GmbH, Heroldsberg, Fed. Rep. of Germany

[21] Appl. No.: 840,551

[22] PCT Filed: May 20, 1985

[86] PCT No.: PCT/DE85/00170
§ 371 Date: Mar. 14, 1986
§ 102(e) Date: Mar. 14, 1986

[87] PCT Pub. No.: WO85/05503
PCT Pub. Date: Dec. 5, 1985

[30] Foreign Application Priority Data

May 18, 1984 [DE] Fed. Rep. of Germany ....... 3418629

[51] Int. Cl.$^4$ .............................................. H01S 3/20
[52] U.S. Cl. ......................................... 372/54; 372/53
[58] Field of Search .................... 372/53, 54, 18, 58

[56] References Cited

U.S. PATENT DOCUMENTS

| | | | |
|---|---|---|---|
| 3,766,489 | 10/1973 | Rosenberg et al. | 372/18 |
| 3,826,577 | 7/1974 | Irwin | 356/201 |
| 3,992,684 | 11/1976 | Patrick et al. | 372/53 |
| 4,403,324 | 9/1983 | Wöste | 372/53 |
| 4,441,188 | 4/1984 | Stone | 372/53 |
| 4,535,457 | 8/1985 | Schlie et al. | 372/58 |

FOREIGN PATENT DOCUMENTS 0026093 4/1981 European Pat. Off. .

*Primary Examiner*—Leon Scott, Jr.
*Attorney, Agent, or Firm*—Barnes & Thornburg

[57] ABSTRACT

Apparatus for preventing deposition of dye on laser apparatus elements comprises a device for vacuum removal of dye vapor from a dye jet in the dye circuit of the laser.

5 Claims, 1 Drawing Sheet

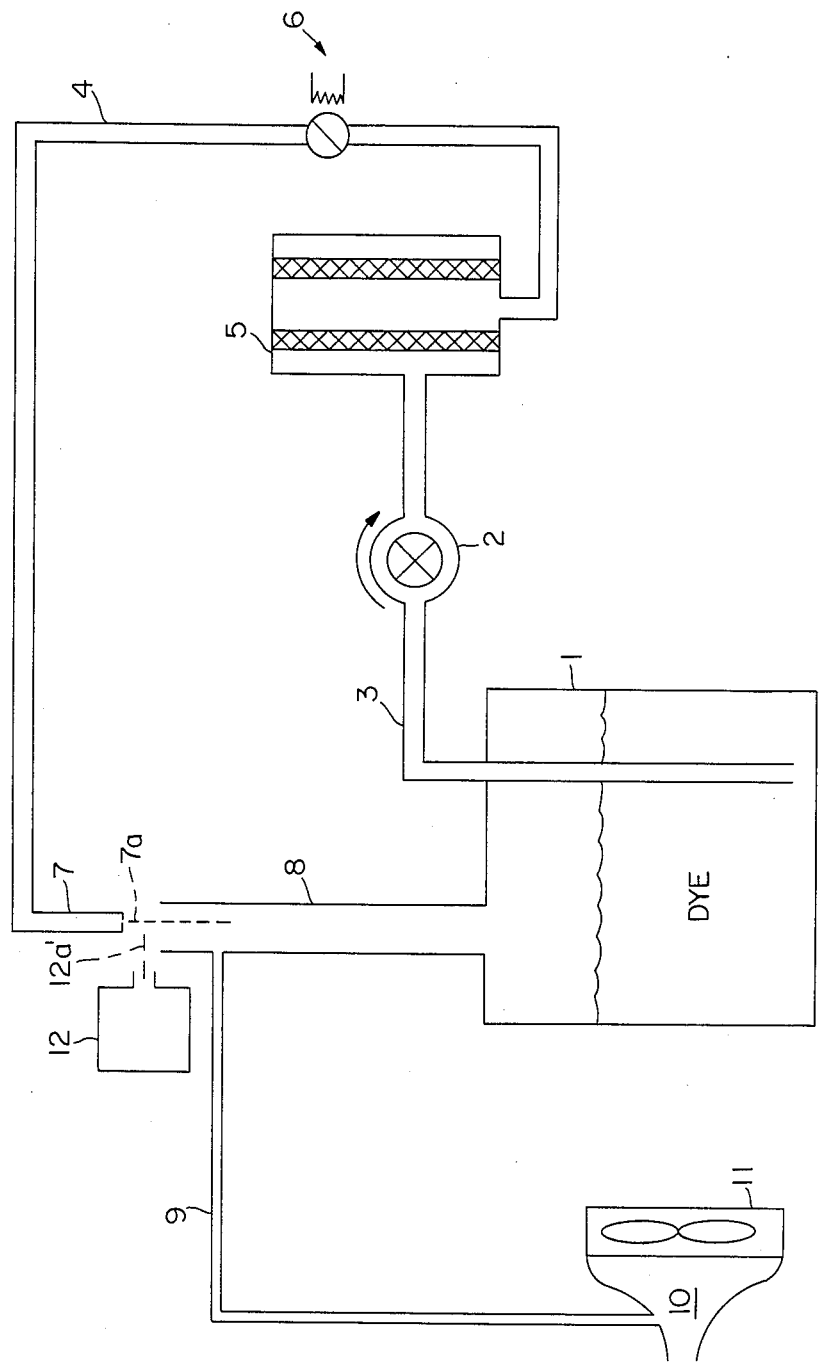

DYE LASER

TECHNICAL FIELD

The invention relates to a dye laser wherein the dye emerges via a nozzle as a jet into the beam path of a pumping laser and flows thence via a collecting line to a supply tank.

PRIOR ART

In a dye laser as set forth above, the dye is sucked by a pump from a storage vessel and emerges via a nozzle in the form of a jet, at which the laser beam of a further laser, the so-called pumping laser, is directed, which triggers the laser operation in the dye.

Due to a large number of causes, for example, local fluctuations of density of the dye, the pumping laser beam may vaporize the dye in the jet. The vaporized dye is deposited on the constructional components in the laser, for example, on the laser mirrors, etc. This deposit must be periodically removed in the case of the prior art dye lasers, since it disturbs their operation.

These periodically required cleaning operations can be tolerated in a dye laser used as a laboratory model, but not in a dye user employed commercially, for example, in an eye treatment apparatus.

SUMMARY OF THE INVENTION

It is an object of the invention to provide an improved laser. It is an object of the invention to design a dye laser wherein the dye emerges via a nozzle as a jet into the beam path of a pumping laser and flows thence via a collecting line to a supply tank so as to lengthen economically the periods between servicing to deal with the dirtying of the laser by dye precipitation.

The invention is based on the realization that the simplest solution to the problem of dye deposit is not to design the laser in such a way as to reliably prevent brief evaporations of the dye in the jet. In contrast, it is substantially less expensive so as to develop the laser as to prevent any dye vapor from being deposited inside the laser, for example, on the mirrors. To this end, connected to the manifold is a negative pressure device which produces a slight negative pressure in the manifold. The negative pressure in the manifold causes, in the zone of the jet, a flow which entrains any dye vapor which may have evolved into the manifold.

In the very simple construction of the laser, the negative pressure or vacuum device used is a venturi nozzle which is disposed on a ventilator and connected via a negative pressure line in the manifold. As a result, additional expenditure is limited to a comparatively easily produced nozzle and a line, since a ventilator is used, for example, for the power supply unit, in practically all dye lasers.

BRIEF DESCRIPTION OF THE DRAWINGS

A vacuum device comprises a venturi jet connected to a connecting line by a vacuum line, said jet being disposed on the suction side of a fan mounted in a housing on a dye laser.

DETAILED DESCRIPTION

The dye is contained in a storage vessel 1. A pump 2 sucks dye from the storage container 1 via a line 3 and pumps its via a line 4, a filter 5, and a magnetic valve 6, by means of which the dye circuit can be blocked in the non-operational condition, to a nozzle 7, from which the dye emerges in the form of a jet 7a. Directed at the jet 7a is the jet 12a of a pumping laser 12, by which the dye is caused to "laser".

The dye flows out of the zone of the jet into a subjacent manifold 8, via which it flows back to the storage container 1.

The suction zone 10 of a ventilator 11 is connected via a negative pressure line 9 to the manifold 8.

The ventilator 11 is a ventilator used in the dye laser for other purposes, for example, for cooling a power supply apparatus, such as is used in practically every dye laser.

The suction zone 10 of the ventilator 11 can be constructed in the form of a venturi nozzle. The connection 9 of the manifold to the ventilator 11 will always set up in the manifold 8 a certain negative pressure causing a flow in the zone of the jet which can "wrench" any dye vapor formed by the pumping laser beam into the manifold 8. This prevents dye from becoming deposited, for example, on elements of the dye laser which are not shown, such as, for example, laser mirrors.

The above is a description of a dye laser according to the invention. The most various modifications are contemplated within the framework of the general inventive idea: The negative pressure device illustrated can be replaced by any device capable of generating in the jet zone a "preferential" flow, which prevents dye vapor from being deposited in the dye laser. However, preferably already existing parts of the dye laser, such as, for example, ventilators or pumps are also used for the negative pressure device. Of course, the ventilator 11 can produce a negative pressure in the manifold 8 by negative pressure lines of any construction and nozzles in the ventilator zone.

In the zone in which the dye may evaporate, cooled surfaces etc. can also be provided, on which the dye vapor condenses before running into the return line system Moreover, the basic ideas according to the invention can be used in dye lasers with a "jet dye circuit", independently of their special construction.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A dye laser apparatus included in a dye laser of the type which includes transporting dye via a nozzle to emerge as a dye jet with dye vapor after irradiation by a pumping laser; said dye being subsequently transported to a manifold and a supply tank, said apparatus comprising:
   collecting line means for collecting said dye vapor; and vacuum means for generating a vacuum in said collecting line means, to draw said dye vapor into said collecting line means.

2. A dye laser according to claim 1, wherein the vacuum means comprise a venturi nozzle means connected to said manifold by a vacuum line, said venturi nozzle means being disposed on the suction side of a fan mounted in a housing on the dye laser for removing dye vapor through said manifold.

3. A dye laser apparatus comprising:
pumping means for generating a laser beam in a dry active medium;
optical elements for guiding said laser beam;
dye jet generating means for generating a dye jet with dye vapor in a dye jet zone passing through said laser beam; and
vacuum means for substantially preventing deposition of said dye vapor on said optical elements, said vacuum means applying a negative pressure proximate to said dye jet zone for removing dye vapor from said dye jet zone.

4. A dye laser apparatus according to claim 3, wherein said vacuum means comprise a fan, and a venturi nozzle means.

5. A dye laser according to claim 3, further including a manifold means for collecting said dye jet and said dye vapor after passing through said laser beam, said vacuum means being connected to said manifold by a vacuum line such that said negative pressure exists in said manifold and thereby draws said dye vapor into said manifold.

* * * * *

UNITED STATES PATENT AND TRADEMARK OFFICE

Certificate

Patent No. 4,740,979                          Patented: April 26, 1988

On petition requesting issuance of a cetificate for correction of inventorship pursuant to USC 256, it has been found that the above-identified patent, through error and without any deceptive intent, improperly sets forth inventorship. Accordingly, it is hereby certified that the correct inventorship of this patent is:
Eckhard Schroeder and Ludger Woste.

Signed and Sealed this Sixth Day of March, 1990.

WILLIAM L. SIKES

*Supervisory Patent Examiner*
                                                                        *Group Art Unit 251*